Dec. 24, 1929.  H. RUSACK  1,741,077
NUT LOCK
Filed Feb. 11, 1928
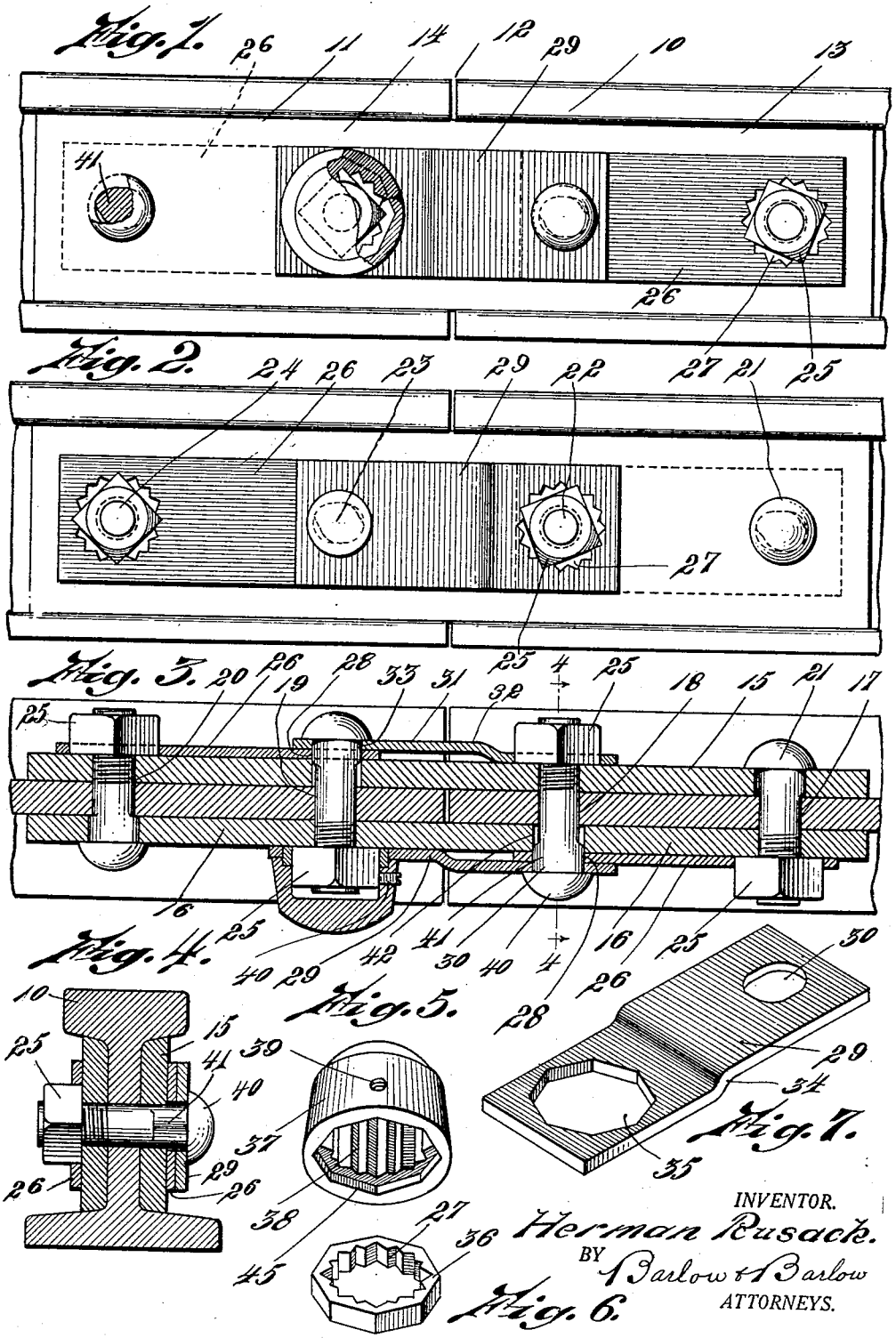
INVENTOR.
Herman Rusack.
BY Barlow & Barlow
ATTORNEYS.

Patented Dec. 24, 1929

1,741,077

UNITED STATES PATENT OFFICE

HERMAN RUSACK, OF PROVIDENCE, RHODE ISLAND

NUT LOCK

Application filed February 11, 1928, Serial No. 253,686, and in Germany March 18, 1927.

This invention relates to a lock for the nuts of bolts used for fastening railway joints; and has for its object to provide a construction by which the nut may be locked in any one of a large variety of positions of rotation relative to the locking plates and to the rail.

A further object of the invention is the provision of a plurality of nut locking plates which may be assembled at the time the rail joint is secured together, with a provision in one of the plates to permit the last bolt of the nut to be rotated into binding engagement; and then be locked to a previously positioned plate by a separate locking member to be subsequently positioned.

A still further object of the invention is the provision of a cap which may be additionally used where desired for locking the last positioned nut and prevent accidental removal.

With these and other objects in view, the invention consists of certain novel features of construction, as will be more fully described, and particularly pointed out in the appended claims.

In the accompanying drawings:

Figure 1 is a side elevation of a rail joint with my improved locking plates mounted in position thereon and with the cap partially broken away to illustrate the construction covered thereby.

Figure 2 is a side elevation looking at the opposite side of the rail from that illustrated in Figure 1.

Figure 3 is a sectional view looking from the top of the rail with the fish plates mounted thereon and the lock for the nuts in position.

Figure 4 is a sectional end view on line 4—4 of Figure 3.

Figure 5 is a perspective view of the cap.

Figure 6 is a perspective view of the locking member.

Figure 7 is a perspective view of the last assembled plate, illustrating the opening therein as being of a shape to receive and hold the locking member, shown in Figure 6, against rotation.

It is found in practice that there is a relative movement of the parts at the joint for the ends of rails due to heavy loads which causes a loosening of the nuts for securing the bolts in position and in order to prevent this undesirable loosening, I have provided an improved device by means of which the nut on the end of the bolt may be locked in any one of a great variety of positions of rotation whereby the nut need not be rotated sufficiently to cause its regular outline, which is usually either square or hexagonal, to assume any definite relation to the rail. The nut can be turned one-eighth or one-sixteenth or some small fractional part of a complete rotation and be locked in either of these desired positions of fractional rotation; and in order that the joint assembly may be practically positioned with all of the nuts positively locked, I have provided a construction by which the locking plates may be assembled with the joint toward the center thereof from opposite directions by providing an opening large enough to permit rotation of the last binding nut with a separate locking member provided with means to prevent a relative rotation thereof in the plate with also a cap member which may be used if desired to further lock this last positioned binding nut in place; and the following is a detailed description of the present embodiment of this invention illustrating one construction by which these advantageous results may be accomplished.

With reference to the drawings, 10 designates the end portion of one rail and 11 the end portion of another rail, which rails are positioned end to end. Figure 1 illustrates a space 12 between the rails to permit of the necessary expansion. On the opposite sides of the fin portions 13 and 14 of these rails there are provided supporting fish-plates 15 and 16 to lap the joint at the ends of the rails. These fish-plates are provided with spaced openings which register with openings 17 and 18 in the end portion 10 and openings 19 and 20 in the end portion 11 through which openings bolts 21, 22, 23 and 24 are placed alternating in opposite directions as clearly illustrated in Figure 3. Each of these bolts has a round head 40 with an elliptical portion 41 just under the head to fit in a corresponding elliptical opening 42 in the fish plate and prevent rotation of the bolt therein. Each of these bolts is secured in position by means of a nut 25 which is of any regular outline such as hexagonal or square, the latter of which is illustrated herein as it is this form which is in general use on the railways in the United States.

In order to lock the nuts 25 against a loosening rotation, I have provided a plurality of plates to extend along the fish plates and in contact therewith each with an opening to fit over the nut 25 on a bolt to prevent the same from loosening and with an opening 28 adjacent the other end thereof to fit over the next bolt to prevent movement of the lock plate on the fish plate.

In securing the end portions 10 and 11 of the rails together, the fish plates are customarily first placed on either side of the fins 13 and 14 and then the two end bolts 21 and 22 are placed in position and their nuts 25 screwed firmly against the fish plates to bind the parts together. To lock the thereby secured nuts in position, flat plates 26 are then placed one on either side of the rails and lying flush with the fish-plates with their openings 27 shaped as illustrated fitting over the nuts 25 to prevent rotation thereof.

The openings 28 in the plates 26 are so positioned as to register with the openings 18 and 19 in the rail fins and a locking plate 29 is then placed in position, as illustrated in Figure 3, with its opening 30 registering with the opening 18 in the fin of the rail 10 which bolt 22 is passed therethrough and the nut on the end of this bolt is rotated to tightly bind the same in position. After the bolt 22 is thus positioned plate 31 having a locking opening 27 therein is then placed over the nut 25 on the end of the bolt 22 and is offset as at 32 the thickness of plate 26 so as to lie flat upon the plate 26 as illustrated in Figure 3. An opening 33 in plate 31 registers with the opening 19 in the fin of rail 11 and bolt 23 is passed therethrough with its threaded end in the opening 35 in the previously positioned plate 29 which plate is offset as at 34 to allow the same to lie flat on the fish plate 16. The opening 35 which is of any regular shape, here shown hexagonal, is of a size sufficient to permit rotation of the nut 25 therein. This nut 25 after being rotated to binding position is locked by a member 36 having an opening 27 therein to fit over nut 25 the member being hexagonal in shape to fit into opening 35 in the plate 29 into which it is forced to seat so that it is frictionally held and is locked therein against rotation.

The lock member 36 is of a thickness slightly greater than the thickness of the plate 29 into which it fits and in order to further secure this nut and locking member in position I provide a cap 37 which has both a hexagonal recess 45 and a notched recess 38 therein, the latter being similar to that illustrated at 27 to be forced over the nut 25 and the locking member 36 to prevent removal thereof. A still further securing means may be provided for the cap by threading an opening 39 to receive a set screw 40 to bind against the nut 25.

The notches which are provided in the edge of the opening 27 are arranged in a certain definite multiple of the number of corners on the nut to be received, that is, for instance, as illustrated in Figures 1 and 2, there are sixteen notches in the edge of the opening 27 which allow the four cornered square nut 25 to be positioned with its corners in four different relative positions of rotation, whereby in rotating the nut in the threaded end of the bolt there will be sixteen different positions in each complete rotation in which the nut may be locked.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a nut lock for a rail joint having a plurality of fastening bolts with securing nuts thereon, comprising a plurality of detachable plates disposed on opposite sides of the rail through which a plurality of bolts extend, one of said plates having an opening therein to receive and lock a nut, another of said plates having an opening of a size to permit the nut which it receives to turn therein and a removable, locking member having an opening to receive and fit the nut and of an outside shape and dimension to fit the plate opening, the shape and engagement of said member and last said plate opening being such as to prevent relative rotation of the plate and member and to retain the member in position.

2. In a nut lock for a rail joint having a plurality of oppositely-disposed bolts with nuts thereon, comprising a plurality of detachable plates disposed on opposite sides of the rail through which a plurality of bolts extend, means for preventing rotation of said plates relative to said rail, one of said plates having an opening therein with notched edges to receive and lock a nut with its corners in a plurality of different adjusted positions relative to said plate, another of said plates having an opening therein of a size to permit the nut which it receives to turn therein, a removable locking member to fit in the last said plate opening, said locking member and plate having engaging surfaces to prevent relative rotation of the member and plate and to retain the member in position, said member having an opening to receive and lock a nut in different adjusted positions.

3. In a nut lock for a rail joint having a plurality of oppositely-disposed fastening bolts with nuts thereon, comprising a plurality of detachable plates disposed on opposite sides of the rail, each of said plates having openings therein spaced apart substantially the distance between the fastening bolts to receive two of said bolts therethrough, one of said plates having an opening therein with notched edges to receive and lock a nut in different adjusted positions, another of said plates having an opening therein of a size to permit the nut which it receives to turn therein, a removable locking member to fit in the last said plate opening, means between said locking member and plate to prevent relative rotation of the member, said member having an opening to receive and lock a nut in different adjusted positions and means for holding said locking member in position.

4. In a nut lock for a rail joint having a plurality of fastening bolts with securing nuts thereon, comprising a plurality of plates disposed on opposite sides of the rail, one of said plates having an opening therein to receive and lock a nut in different adjusted positions, another of said plates having an opening of a size to permit the nut which it receives to turn therein, a locking member having an opening to receive and fit the nut and of an outside shape and dimension to fit the plate opening, the shape of said member and last said plate opening being such as to prevent relative rotation of the plate and member, and a cap secured over said locking member to assist in holding it in position.

5. In a nut lock for a rail joint having a plurality of fastening bolts with securing nuts thereon, comprising a plurality of detachable plates disposed on opposite sides of the rail through which a plurality of bolts extend, one of said plates having an opening therein to receive and lock a nut, another of said plates having an opening of a size to permit the nut which it receives to turn therein and a removable locking member having an opening to receive and fit the nut and of an outside shape and dimension to fit the plate opening, the shape of said member and last said plate opening being such as to prevent relative rotation of the plate and member and retain said member in position in said plate.

In testimony whereof I affix my signature.

HERMAN RUSACK